United States Patent [19]

Wolf et al.

[11] Patent Number: 4,895,355

[45] Date of Patent: Jan. 23, 1990

[54] SPRING DEVICE FOR USE IN MOUNTING APPARATUSES

[75] Inventors: Franz Josef Wolf; Hubert Pletsch, both of Bad Soden-Salmünster, Fed. Rep. of Germany

[73] Assignee: Woco Franz-Josef Wolf & Co., Fed. Rep. of Germany

[21] Appl. No.: 201,121

[22] PCT Filed: Aug. 20, 1987

[86] PCT No.: PCT/EP87/00469

§ 371 Date: Apr. 22, 1988

§ 102(e) Date: Apr. 22, 1988

[30] Foreign Application Priority Data

Aug. 25, 1986 [DE] Fed. Rep. of Germany ....... 3628838

[51] Int. Cl.⁴ ............................ F16F 1/36; F16F 1/06; F16M 13/00
[52] U.S. Cl. .................................... 267/257; 248/613; 267/153; 267/168
[58] Field of Search .................. 267/73, 74, 151, 152, 267/153, 136, 168, 170, 179, 140, 140.3, 219, 181, 140.1, 286, 292, 237, 238, 250, 257, 258, 259, 289, 291; 180/300, 312; 248/613, 620, 632

[56] References Cited

U.S. PATENT DOCUMENTS

| | | | |
|---|---|---|---|
| 2,382,372 | 10/1942 | Wallerstein | 267/293 |
| 2,817,510 | 12/1957 | Horan | 267/257 X |
| 2,932,474 | 4/1960 | Becker et al. | 267/140.3 |
| 3,089,714 | 5/1963 | Croy | 285/165 |
| 3,229,951 | 1/1966 | Quick | 267/136 |
| 3,305,227 | 2/1967 | Henley | 267/153 |
| 3,323,764 | 6/1967 | Johnson | 267/152 X |
| 3,382,372 | 5/1968 | Hutchins et al. | 365/91 |
| 3,430,901 | 4/1969 | Cauvin | 248/632 X |
| 3,669,467 | 6/1972 | Dunlap et al. | 267/258 X |
| 4,595,167 | 6/1986 | Tangorra et al. | 248/638 |

FOREIGN PATENT DOCUMENTS

| | | |
|---|---|---|
| 662622 | 7/1938 | Fed. Rep. of Germany ...... 267/292 |
| 738791 | 7/1943 | Fed. Rep. of Germany . |
| 1006673 | 4/1957 | Fed. Rep. of Germany . |
| 1260884 | 2/1968 | Fed. Rep. of Germany . |
| 3535897 | 6/1986 | Fed. Rep. of Germany . |
| 3714363 | 11/1987 | Fed. Rep. of Germany ...... 267/170 |
| 0619747 | 8/1978 | U.S.S.R. ............................ 248/620 |
| 618602 | 2/1949 | United Kingdom . |
| 1410426 | 10/1975 | United Kingdom . |
| 2011579 | 7/1979 | United Kingdom ............... 267/153 |
| 1602265 | 11/1981 | United Kingdom . |

Primary Examiner—Robert J. Oberleitner
Attorney, Agent, or Firm—Burns, Doane, Swecker & Mathis

[57] ABSTRACT

The invention relates to a spring device capable of softly dissipating the energy of an accelerated mass which is relatively great with respect to the inert mass of a reference system coupled to said spring device. The force deflection curve of said spring device exhibits an abrupt steep rise within the linear working range of the force deflection curve so that the required deflection is reduced. The spring device can include a soft suspension spring coupled to a control spring.

11 Claims, 2 Drawing Sheets

SPRING DEVICE FOR USE IN MOUNTING APPARATUSES

BACKGROUND OF THE INVENTION

The invention relates to a spring device and more particularly, to a spring device having an abrupt steep rise within the linear range of its force deflection curve.

Normally it is not a great problem to softly dissipate small masses. However, the soft dissipation of greater masses is troublesome, so that compromises have to be found. As a result the desired soft dissipation of greater masses cannot be readily. The problem arises that the coupling of greater masses to soft spring devices lads, even in the case of small accelerations, to critically long linear deflections causing critical accelerations during the negative deflection. As an example, it is desirable in the car construction art that the engine of a car be mounted as softly as possible. When mountings having the desired soft spring characteristics are amplitudes of the motor block result even if the street is not very rough. Thus serious problems arise with respect to the power transmission from the engine to the wheels. In addition, the driving comfort is adversely influenced. Under certain circumstances this also affects the stability of the car while driving. Due to that behaviour, the engines of cars have been mounted harder. The same holds true for numerous other problems in the art of mountings with respect to the supporting mountings as well as with the suspension mounting. Such problems arise for instance when mounting fixed oscillating engines, when mounting measuring devices and measuring tables and when mounting complete industrial buildings.

SUMMARY OF THE INVENTION

In view of the problems in the art mentioned above, it is an object of the present invention to develop a spring device which can to softly dissipate greater masses, and in particular strong acting forces whereby the total extension of the spring, i.e. the total linear deflection, is substantially shorter than the linear deflection required for the effective soft dissipation of the acting forces or the mass to be dissipated.

The above object is solved according to the present invention by a spring device having an abrupt steep rise within the linear range of its force deflection curve.

In particular, the object of the present invention is achieved by the fact that the linear range of the force deflection curve, which is the effective range thereof, is divided into two subranges which are set-off in a parallel manner with respect to each other. Consequently, the energy, which is introduced into the spring device or the spring device system by the spring mounted accelerated mass (or the spring mounted accelerated load to be spring mounted), is dissipated softly or at least substantially in a linear fashion at the beginning and during the end phase of the spring deflection. However, the substantial part, and very often the main part of the energy introduced into the system is rigidly dissipated in the middle range of the spring deflection or the middle range of the linear deflection, respectively. Depending upon the particular situation and the requirements of each case, the three ranges can be quantitatively arranged or distributed in various ways. Preferably about 30 to 70%, and in particular 40 to 60% of the total energy which is introduced into the spring device during one load is dissipated rigidly and that rigid dissipation constitutes not more than 20%, preferably 1 to 10%, of the total linear deflection required. However, about 1 to 10% of the total energy introduced into the spring system is dissipated during the initial phase of the spring deflection, i.e. at the beginning of the linear deflection, within the linear range of the force deflection curve.

In the case of weak damping spring the force deflection curve within the negative deflection range is substantially the same as the force deflection curve of the spring during the initial load. This is also valid for a pressure spring within the range of the extension of the spring body and for a tension spring within the range of the contraction of the spring exceeding the origin.

This form of the force deflection curve of the spring device according to the present invention is based on the finding that the energy of an accelerated mass coupled thereto, wherein energy is transferred rigidly or even in an unsprung manner via an intermediate spring to a reference system connected with the bearing of the spring, does not adversely influence the reference system to a great extent so long as the mass of the load to be dissipated in the case of a given acceleration or amplitude is relatively small compared to the mass of the reference system. The reference system is adversely affected only when the mass of the load to be dissipated increases so that a soft dissipation of the coupled accelerated mass coupled would be only necessary within this range if the reference system shall not be substantially disturbed.

By way of example, it assume that a car has a weight of for instance 1500 kg and is equipped with an engine having a weight of only 25 kg. With respect to the driving behaviour and the oscillating behaviour of the car, such a small engine could be oscillated in practically any desired manner without substantially influencing the driving comfort of the car. In this example resonance effects are, of course neglected. If the car is, however, equipped with an engine weighing, for instance, 100 kg and representing therefore a relatively large mass compared to the car itself the oscillations of the engine have a large influence on the driving comfort and the driving stability of the car By providing a linear and soft or even very soft dissipation of such a heavy engine in the desired manner over the complete working range, the engine would perform linear deflections or would oscillate with an amplitude which would be very similar to a trampoline. This is not acceptable for the car production industry. The present invention remedies this deficiency. In the case, of oscillations having small amplitudes, a large to very large part of the energy introduced by the load into the spring is dissipated after a short initial spring range as rigidly as possible and in the desired manner. The amount of energy rigidly dissipated depends in each case on the inert mass of the reference system coupled to the bearing of the spring. The mass will be excited by the rigidly dissipated part of the energy to a degree which is negligibly small under the circumstances given. Thereafter, that part of the energy introduced by the load into the spring which would not simply accelerate the inert mass of the reference system is softly dissipated by the spring. The result of the hard dissipation (i.e. the dissipation having a short linear deflection within that range in which the energy transferred via the rigid spring force deflection curve to the inert mass of the reference system is not sufficient to accelerate the inert mass in a disturbing manner) is a substantial reduction of the linear deflection of the normally softly dissipating suspension spring. The reduction in linear deflection which can be achieved compared to a linear force deflection curve depend of course, on the circumstances of each case, but amounts in general to 50 to 80%.

The explanations given above are not only valid for the case where the spring device is loaded, but also for the negative deflection range extending above the origin of the spring, provided that the spring device or the spring system is designed correspondingly.

The above described process for dissipating relatively heavy masses or the manufacturing of a spring device having the force deflection curve described above can be achieved in rather different manners, taking into account the conditions and requirements of each particular case.

The simplest manner for providing for a spring system having an abrupt steep rise in the force deflection curve is a combination of a soft suspension spring and a control spring, the latter being a kinking spring and being arranged parallel to the suspension spring so that a coupling (normally a mechanical engagement) takes place only after an uncoupled prerun of the suspension spring has taken place. The kinking point of the kinking spring, i.e. the linear deflection of the control spring, at which point it practically loses its spring elasticity, is smaller or shorter than the linear deflection which represents the upper limit of the linear section of the force deflection curve. In the case described above all linear deflections refer to the same system and the same origin of the system. Thereby the symmetry of the force deflection curve of the spring can be extended over the origin of the system to the negative deflection range. This is preferably realized by providing for a second backward control spring which can be coupled to the soft suspension spring after a corresponding prerun, the second control spring being symmetrical to the above described first control spring and having spring characteristics which are identical to those of the first control spring.

The spring devices having a kinking force deflection curve which are used as control springs in the spring system of the present invention may be and are preferably bistable springs, i.e. springs having two stable final positions such as oversnapping leaf springs or spring-lever-mechanisms, overextendable spiral tension springs or rubber springs having a wall-kinking effect, such as cellular or foamed material or buffers having hollow cavities. Those spring devices lose their elasticity almost completely after a critical load or a critical linear deflection has been surpassed since the elastically dissipating walls are kinked in.

According to a further embodiment of the present invention the spring device of the present invention consists preferably of rubber springs only. The suspension spring is preferably a rubber buffer having bores and cavities therein, whereas the control spring is a kinking mounting having hollow chambers. According to the present invention a rubber buffer having bores and cavities therein is a usual solid rubber buffer having channels and/or hollow chambers or being interspersed therewith which do not exhibit wall kinking effects even though they can be strongly deformed and even completely pressed together. A kinking mounting having hollow chambers is for instance a section of a rubber hose which, when being loaded in the axial direction and exhibiting a steep range of the force deflection curve, is compressable in the beginning by pressing the cylinder jacket until the cylinder walls caused by small variations of the tension lines within the material kink away sidewardly, outwardly or inwardly whereby practically no restoring force is acting against the load. The spring device of the present invention is preferably a pressure spring or a load spring but can also be a tension spring system.

The spring device according to the present invention is preferably used for the construction of engine mountings for cars.

BRIEF DESCRIPTION OF THE DRAWINGS

The invention is explained more fully below with reference to embodiments of the invention referring to the drawings. The drawings are not intended to limit the scope of the present invention. In the drawing:

FIG. 1 shows the diagram of a force deflection curve in which the force F is reported as a function of the linear deflection s of the spring. The typical form of a force deflection curve 1 of the spring device according to the present invention is shown by a full line. After an initial soft linear section 2 the force deflection curve shows a rise which is more or less steep or abrupt. Then after a short linear deflection the force deflection curve verges into the following section 4 which represents the real linear working range of the spring. Thereby at least the sections 2 and 4, which are substantially offset in a parallel manner with respect to each other, represent sections of the same linear force deflection curve of the soft suspension spring of the spring device according to the present invention. It is of course realized that sections 2 and 4 of the force deflection curve of the spring device according to the present invention will not be exactly parallel to each other due to the fact that the control spring, which, in addition to the linear range of the suspension spring, substantially determines the form of the steep rise range 3 of the force deflection curve 1, still possesses after the kink in the deflection curve still a certain residual elasticity which is added to the elasticity, i.e. the spring constant, of the linear range of the suspension spring. This is referred to in the present description as a steep rise 3 within the linear range 2,4 of the force deflection curve.

The shape of the force deflection curve after the final point 5 of the linear range 4 is not essential to the present invention. such curve can be a progressive curve, as shown by the full line, within the range 6 as would be the case if rubber buffers are used. However, the curve can be limited by a stop, as shown by th dotted line, within the range 6' of the force deflection curve 1.

Figure 1:
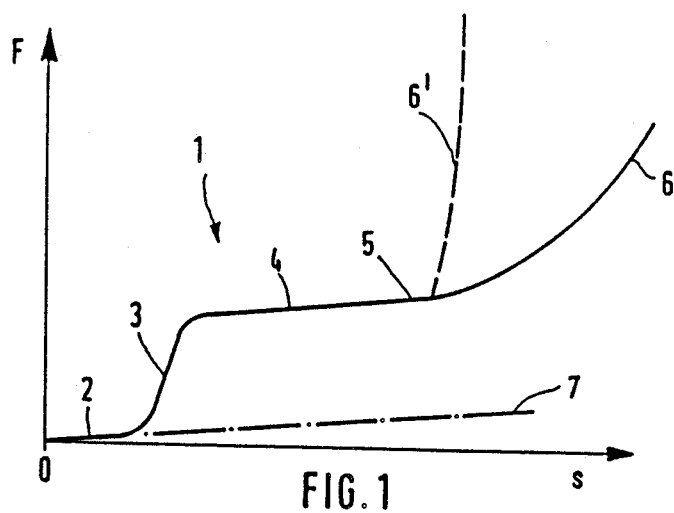
FIG. 1 is a diagram of the force deflection curve of the spring device or spring system according to the present invention.

FIG. 1 further shows the soft linear section in the force deflection curve 7 of the suspension spring of the spring system of the present invention. As can be seen, the soft linear section covers a wide range.

Figure 2:
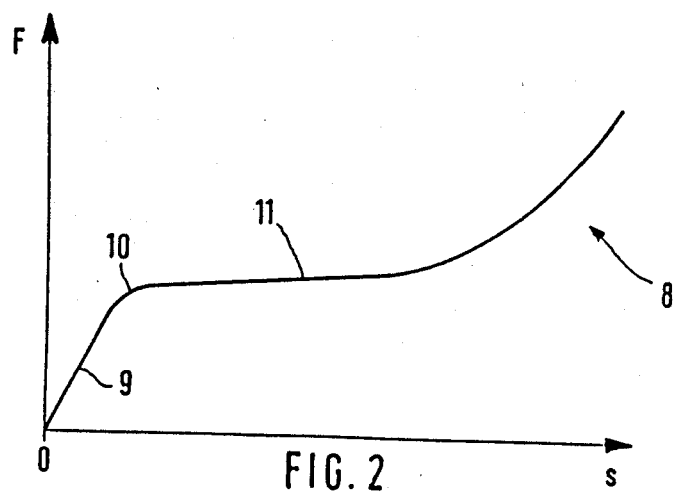
FIG. 2 is a diagram of a typical force deflection curve for a control spring.

FIG. 2 shows the typical form of the force deflection curve 8 of a kinking spring mounting made rubber and having a cavity or cavities therein. AFter a relatively steep and almost linear initial range 9 of the force deflection curve 8, at the kinking point 10, which normally is well defined, the wall of the cavity or the walls of the cavity kink in so that the spring loses practically all its elasticity in the following section 11 up to the point starting from which a material pressing of the elastomer takes place after the collapsed cavities within the spring body have been almost completely pressed together. This results in a section 11 showing a progressive force deflection curve.

From the functional diagrams shown in FIGS. 1 and 2 it can be seen that the force deflection curve 1 of the spring device according to the present invention is similar to an additive superimposition of the force deflection curve 7 of the soft suspension spring and the force deflection curve 8 of the control spring.

Figure 3:
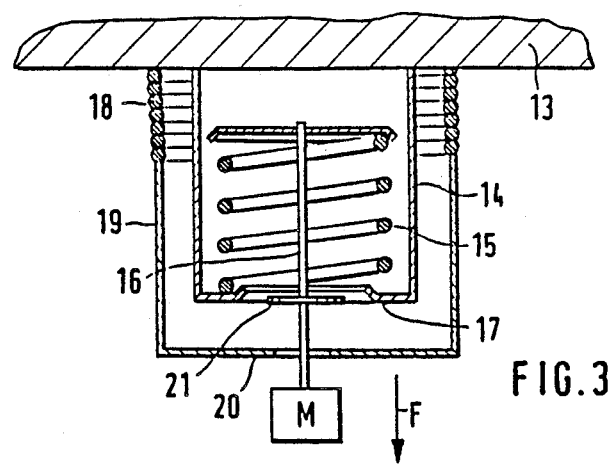
FIG. 3 shows is a cross-sectional view showing a first embodiment of the spring device of the present invention.
Figure 4:
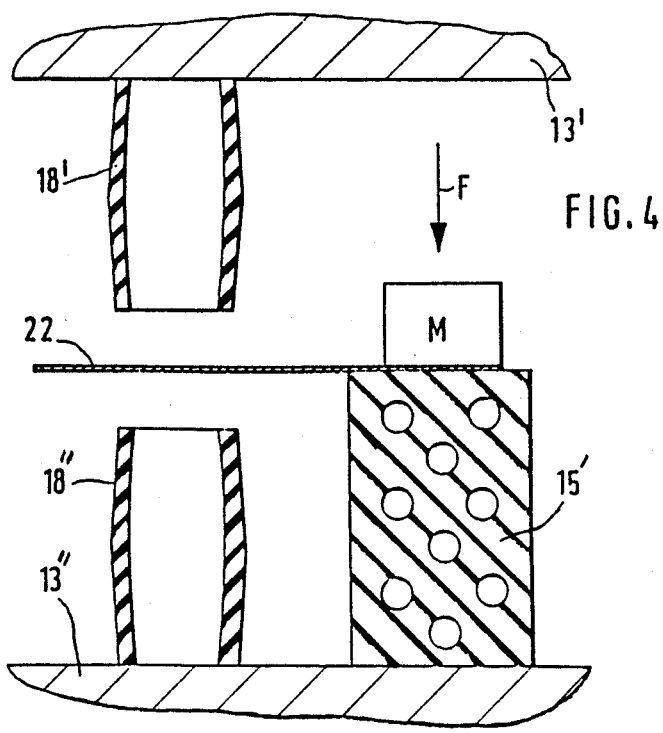
FIG. 4 is a cross-sectional view showing a second embodiment of the present invention.

FIGS. 3 and 4 show cross sectional views of two embodiments of the spring device of the present invention having the force deflection curve 1 as shown in FIG. 1.

FIG. 3 shows a stationary reference system 13, for instance a frame part of a car, on which a soft suspension spring 15 is supported via a bow 14. The suspension spring 15 is a metric spiral spring which is designed to carry a pressure load. At the head of the suspension spring 15 a mass M to be dissipated is suspended via rod 16 under the mounting 17.

The pressure spring system 14,15,16 is coaxially surrounded by a control spring 18 which is a tension spring (i.e. a steel spiral spring) and which is fixed also to the reference system 13. At the lower end point of the control spring 18 there is a fixed a bow 19 having an inwardly projecting flange-like stop device 20 onto which a stop disc 21 can abut if the suspension spring 15 is compressed. The stop disc is fixed to the suspending rod 16 of the suspension spring 15.

When the mass M is accelerated downwards in the direction of the arrow F the energy introduced into the spring 15,18 is introduced softly in the beginning softly and in a linear fashion into the suspension spring 15. This action corresponds to section 2 of the force deflection curve 1 shown in FIG. 1. As soon as the disc 21 is lying on the stop device 20, the energy introduced into the spring system 15,18 is now additionally dissipated by the rigid tension spring 18 so that the force deflection curve of the total system 15,18 shows the steep rise 3 as depicted in the force deflection curve 1 of FIG. 1. The tension spring 18 is designed in such a way that it loses its spring tension after a short extension, i.e. after a relatively short deflection, due to overelongation so that in case of a further downward movement of the mass M the dissipation of this action takes place again almost exclusively via the linear working range of the suspension spring 15. Compared to the spring constant resulting from the suspension spring 15, the remaining spring constant of the overlongated control spring 18, which is added to the spring constant of the pressure spring 15, can be practically neglected. This working range corresponds to the section 4 of the force deflection curve 1 shown in FIG. 2. It can be seen further from FIG. 1 that without the additional tension spring 18, the continuous soft dissipation on the force deflection curve 7 corresponding to the suspension spring 15 would require an almost twice as wide linear deflection of the spring as would be required by the action of the control spring 18 and the thereby caused steep rise 3 in the force deflection curve 1.

A second embodiment of a spring device having the force deflection curve of FIG. 1 and also the mirror symmetry of the deflection range shown in FIG. 1 (i.e. the range through the origin to the side of negative linear deflections) is shown in FIG. 4. The suspension spring 15' is a rubber buffer having bores and cavities therein whereas the control spring 18' is a cavity-kinking mounting made of rubber. In addition to said first control spring there is provided a second control spring 18' which is identical with the first control spring 18' as to its form and characteristics.

In that way, the second control spring 18' is symmetrical with respect to the first control spring 18" as to its force deflection curve and its suspension spring coupling characteristics. The second control spring 18' is arrangedsymmetrically with respect to the first control spring 18" in the negative deflection range of the suspension spring 15'. The three elements of the spring as depicted in FIG. 4 are connected in the manner shown to a reference system 13',13" which is, for instance, a frame clamp of a car. A coupling plate 22 is connected with the head of the suspension spring 15'. The coupling plate 22 extends freely into an interspace between the control springs 18,18". The control springs 18,18' are coaxial face towards each other and are spaced from each other. The single parts 15',22,18,18" of this spring system are designed and aligned in such a manner that the coupling plate 22 extends exactly through the middle of the axial distance between the two control springs 18,18". An oscillating mass M is supported on the suspension spring 15.

If the mass m is accelerated in the direction of the Arrow F the dissipation takes place very softly and in a linear fashion exclusively via the suspension spring 15'. That soft dissipation takes place contacts the upper border of the lower control spring 18". Then control spring 18" applies a force against the mass to be dissipated and the force increases rigidly when the deflection is directed further down. The force of the spring is a result of the compression of the rubber walls of the cavity-kinking mounting 18 made of rubber. However, the walls of the control spring 18" kink outwardly after a short deflection so that at that point practically no elastic active spring energy from the control spring 18" is acting against the spring action. After that, the remaining dissipation of the initial oscillation process of the mass M takes place only via the soft linear section of the force deflection curve of the suspension spring 15, that soft linear section representing the actual working range. After all the energy of the oscillating mass M has been introduced into the spring system, the suspension spring system is returned which is followed by the control spring 18" via the coupling 22, whereby the dynamic energy reduced by the amount which is absorbed in the spring is again applied to the mass M. With respect to the representation given in FIG. 4 the mass then oscillates with this energy into the direction of and extending above the origin of the system as shown in FIG. 4, based on the neutral position of the system as shown in FIG. 4. This means that the mass oscillates into the direction of a negative deflection range and in the same manner as it is described for the initial oscillation process, since the complete spring system is designed in a substantially symmetrical manner. The frequency of the back and forth oscillation process and the amount of the amplitudes are a function of the damping of the spring system. For purposes of the present invention, one of the main objectives is to achieve a soft dissipation of a relative great mass M with respect to the inert mass of the reference system 13 whereby the deflections are shortened. That object is solved in the manner described above by the abrupt steep rise 3 in the force deflection curve 1 of the spring system. That abrupt steep rise 3 in the force deflection curve is achieved in the embodiments described herein by additional control spring 18 or 18" and 18', respectively, which are kinking springs of any desired kind.

It is clear that one need not rely solely on the embodiments shown in the FIGS. 3 and 4 in order to realize the force deflection curve 1 which is essential for the present invention. The resulting force deflection curve shown in FIG. 1 which has an abrupt steep rise 3 in the linear working range 2,4 can also be obtained by applying electronic control means in electromagnetic spring systems and also with a valve control system, for instance pneumatic valve control systems, and pneumatic spring systems.

While this invention has been illustrated and described in accordance with preferred embodiments, it is recognized that variations and changes may be made and equivalents employed herein without departing from the invention as set forth in the claims.

We claim:

1. A spring device comprising:
   first spring means for defining a wide, substantially linear force deflection curve;
   second spring means for defining a force deflection curve having an initial steep rise section followed, after surpassing a critical deflection, by a substantially horizontal section; and
   said first spring means including a suspension spring and said second spring means including a control spring, said suspension spring and said control spring being arranged in parallel with respect to each other so that deflection of said control spring occurs only after an initial predetermined deflection of said suspension spring when said suspension spring is uncoupled from said control spring, whereby the combination of the first and second spring means define a force deflection curve having a substantially linear range and an abrupt steep rise within the substantially linear range.

2. A spring device in accordance with claim 1, and further comprising third spring means for defining a force deflection curve that is substantially symmetrical with respect to the force deflection curve of the second spring means, said third spring means including a second control spring that is arranged symmetrically with respect to said second spring means in a negative deflection range of said suspension spring.

3. A spring device in accordance with claim 2, wherein said second control spring is a bistable spring.

4. A spring device in accordance with claim 2, wherein said second control spring is a rubber spring having means for producing a wall-kinking effect in the rubber spring.

5. A spring device in accordance with claim 1, wherein said control spring is a bistable spring.

6. A spring device in accordance with claim 1, wherein said control spring is a rubber spring having means for producing a wall-kinking effect in the rubber spring.

7. A spring device in accordance with claim 1, wherein said suspension spring and said control spring are made of rubber.

8. A spring device in accordance with claim 1, wherein the suspension spring is a rubber buffer having at least one of bores and cavities therein and the control spring is a spring having means for permitting the spring to kink.

9. A spring device in accordance with claim 1, wherein the combination of the first and second spring means dissipate approximately 40% to approximately 60% of the total energy introduced into the spring device during approximately 1% to approximately 20% of the total spring stroke of the linear range of the force deflection curve.

10. A spring device in accordance with claim 1, wherein approximately 1% to approximately 10% of the total energy introduced into the spring device is softly dissipated during an initial phase of the linear range of the force deflection curve.

11. A spring device in accordance with claim 1, wherein the spring characteristics of said first spring means that define the wide, substantially linear force deflection curve of the first spring means influence the spring characteristics and the force deflection curve of the entire spring device over substantially the entire range of deflection of the entire spring device.

* * * * *